United States Patent [19]

Eddy

[11] 4,325,476
[45] Apr. 20, 1982

[54] APPARATUS FOR MERGING ARTICLES FROM TWO CONVEYOR LINES INTO ONE CONVEYOR LINE

[75] Inventor: William R. Eddy, Kansas City, Mo.

[73] Assignee: Phillips Petroleum Company, Bartlesville, Okla.

[21] Appl. No.: 119,268

[22] Filed: Feb. 7, 1980

[51] Int. Cl.³ .............................................. B65G 47/04
[52] U.S. Cl. ................................... 198/448; 198/467; 198/470
[58] Field of Search ....................... 198/357, 429–430, 198/444, 448, 451, 447, 467, 470, 492

[56] References Cited

U.S. PATENT DOCUMENTS

| | | | |
|---|---|---|---|
| 2,901,083 | 8/1959 | McGrath | 198/357 |
| 3,107,788 | 10/1963 | Thiele et al. | 209/75 |
| 3,160,259 | 12/1964 | Dalton | 198/470 X |
| 3,416,987 | 12/1968 | Keramas | 156/363 |
| 3,568,859 | 3/1971 | Truesdell | 198/448 X |
| 3,753,484 | 8/1973 | Aiuola et al. | 198/448 X |

Primary Examiner—Robert B. Reeves
Assistant Examiner—Douglas D. Watts

[57] ABSTRACT

An improved apparatus for automatically merging articles being transported along a first conveyor line among articles being transported along a second conveyor line. The apparatus senses the proper positioning on the first conveyor line of an article to be merged among articles on the second conveyor line by means of a pneumatic proximity switch which provides an air output signal through a fluid amplifier valve to a cylinder actuating valve which causes two fluid power cylinders to extend, one power cylinder to transfer the sensed article from the first conveyor line to the second conveyor line and the other power cylinder to interrupt the conveyance of articles along the second conveyor line during such transfer. A cam actuated air switch is tripped upon full extension of the article transfer fluid power cylinder to cause automatic retraction of both power cylinders. Both the sensing and actuating elements of the apparatus are pneumatically operated.

9 Claims, 4 Drawing Figures

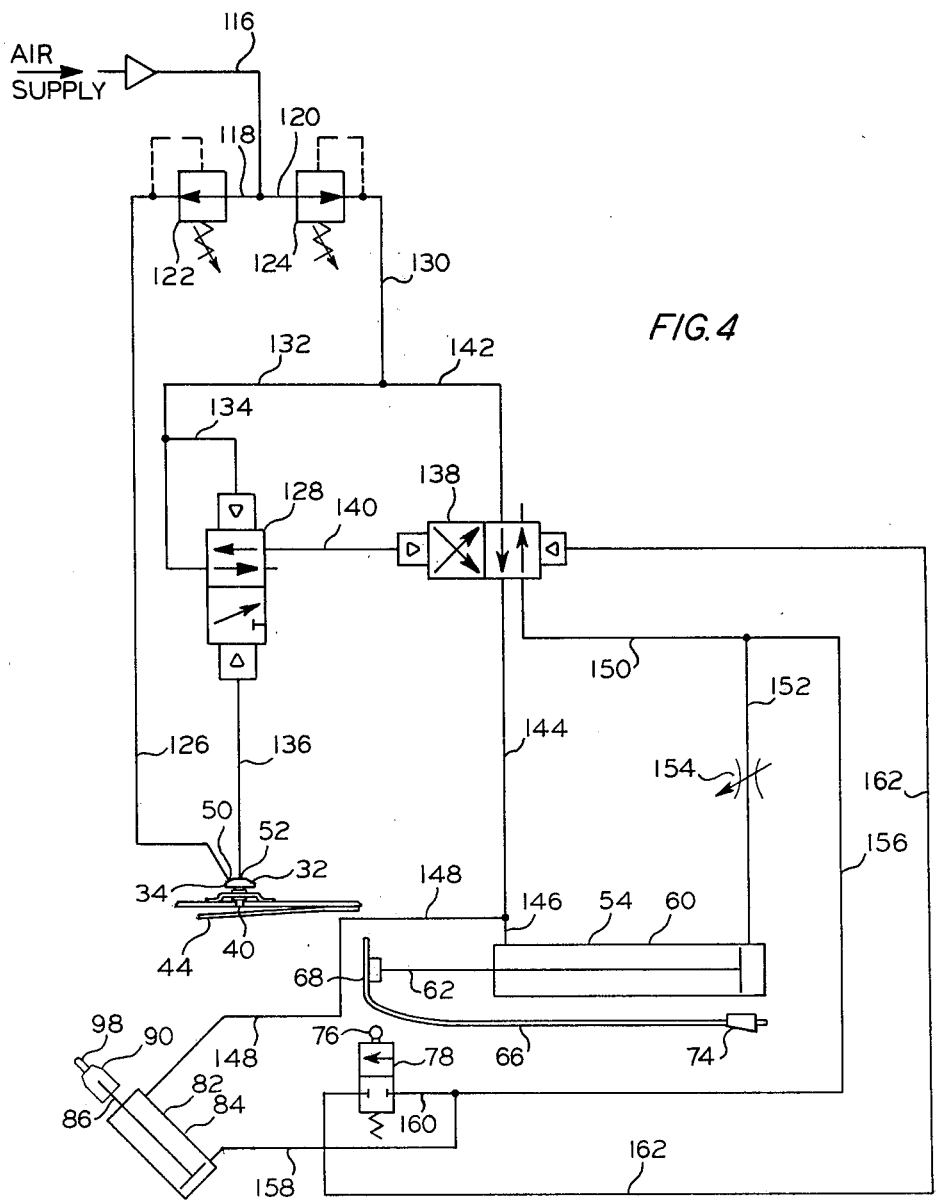

APPARATUS FOR MERGING ARTICLES FROM TWO CONVEYOR LINES INTO ONE CONVEYOR LINE

The invention relates generally to improvements in article conveyor apparatus. In one aspect the invention relates to apparatus for automatically merging articles being conveyed by first and second conveyor lines for conveyance by a single conveyor line. In another aspect the invention relates to a pneumatic control and actuation system for such apparatus.

In the assembly of articles, such as containers constructed of paperboard or the like, assembled or partially assembled containers are often conveyed from one operating station to another along two or more separate, generally parallel conveyor lines. In many instances it is desirable to merge the articles conveyed by two such conveyor lines into a single conveyor line for further processing of the articles.

Accordingly, the present invention contemplates apparatus for automatically merging articles being conveyed by first and second conveyor lines for further conveyance by a single conveyor line. The apparatus comprises article position sensing means disposed adjacent a first position on the first conveyor line and connected in fluid flow communication by first conduit means to a source of pressurized fluid for sensing the presence of an article at the first position and providing a pressurized fluid output signal responsive to the thus sensed presence. The apparatus also includes article transfer fluid power cylinder means disposed adjacent the first position for extending to thereby transfer an article from the first position to a second position on the second conveyor line, and, alternately, for retracting to permit another article to be conveyed to the first position along the first conveyor line. Also provided are article conveyance interrupting fluid power cylinder means disposed adjacent the second position on the second conveyor line for extending to thereby interrupt conveyance of articles past the extended article conveyance interrupting fluid power cylinder means along the second conveyor line, and, alternately, for retracting to permit conveyance of articles past the second position along the second conveyor line. The apparatus is further characterized by inclusion of cylinder actuating valve means connected in fluid flow communication to the article transfer fluid power cylinder means and to the article conveyance interrupting fluid power cylinder means and further connected in fluid flow communication to a source of pressurized fluid by second conduit means for applying pressurized fluid to the article transfer fluid power cylinder means and to the article conveyance interrupting fluid power cylinder means in response to the output signal from the article position sensing means to extend the article transfer fluid power cylinder means and the article conveyance interrupting fluid power cylinder means. Cylinder position sensing means are connected to a source of pressurized fluid for sensing the full extension of the article transfer fluid power cylinder means and providing a pressurized fluid output signal responsive to the full extension of the article transfer fluid power cylinder means. The previously mentioned cylinder actuating valve means is further adapted for applying pressurized fluid to the article transfer fluid power cylinder means and to the article conveyance interrupting fluid power cylinder means in response to the output signal from the cylinder position sensing means to retract the article transfer fluid power cylinder means and the article conveyance interrupting fluid power cylinder means.

An object of the invention is to increase the efficiency of article conveyor apparatus.

Another object of the invention is to provide apparatus for automatically merging articles being conveyed by first and second conveyor lines for conveyance by a single conveyor line.

A further object of the invention is to provide apparatus for merging articles from first and second conveyors into a single conveyor which is both gentle and reliable in operation.

A still further object of the invention is to provide apparatus for merging articles from first and second conveyors into a single conveyor which is economical in construction and operation.

Other aspects, objects and advantages of the invention will be evident from the following detailed description and claims when read in conjunction with the accompanying drawings in which:

FIG. 4 is a schematic diagram of the pneumatic system of the invention.

Figure 1:
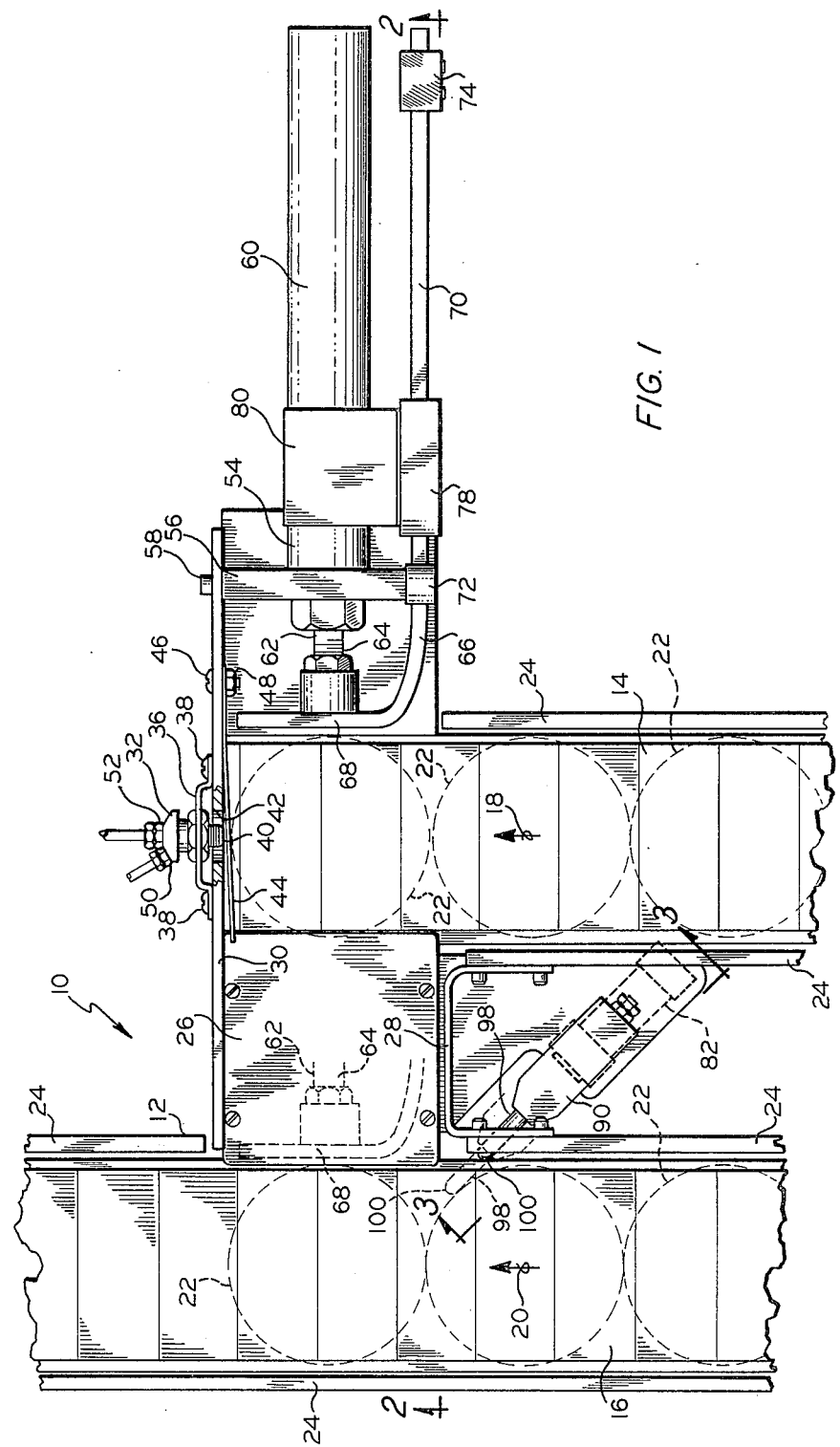
FIG. 1 is a partial plan view of apparatus constructed in accordance with the invention.
Figure 2:
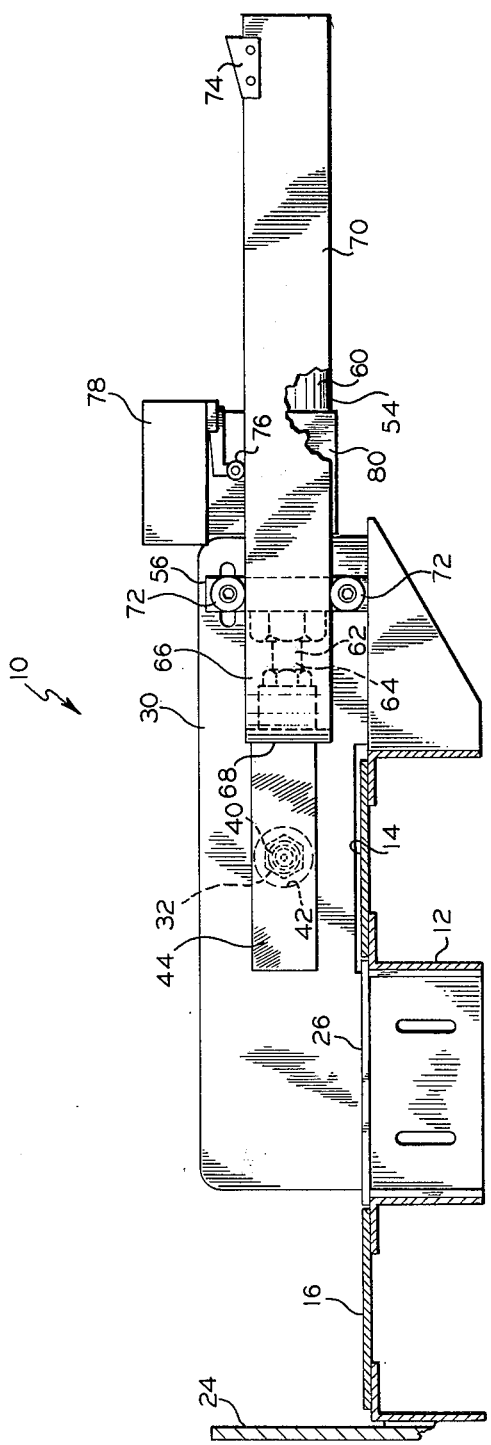
FIG. 2 is a partial cross-sectional view taken along line 2—2 in FIG. 1.
Figure 3:
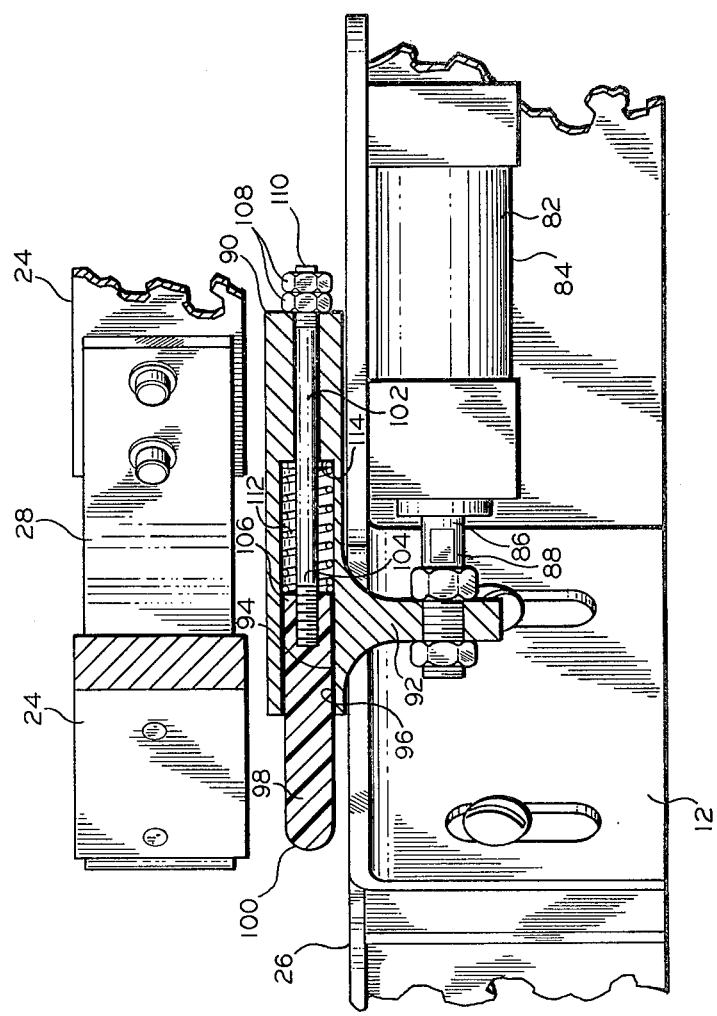
FIG. 3 is an enlarged partial cross-sectional view taken along line 3—3 of FIG. 1.

Referring now to the drawings, there is illustrated therein a multiple line conveyor apparatus generally designated by the reference character 10. The apparatus 10 comprises a support frame 12 upon which are supported first and second conveyor lines 14 and 16. The conveyor lines 14 and 16 move respectively in the directions indicated by the arrows 18 and 20. Each of the conveyor lines 14 and 16 is adapted to convey a series of articles 22 therealong, such as, for example, assembled or partially assembled tubular paperboard containers or the like. The articles 22 are guided along each of the conveyor lines 14 and 16 by means of upwardly extending guide rails 24 positioned on each side of each of the conveyor lines.

The multiple line conveyor apparatus 10 is provided with apparatus for automatically merging the articles 22 being conveyed by the first and second conveyor lines 14 and 16 for conveyance by a single conveyor line, in this case the second conveyor line 16. The apparatus for automatically merging the articles includes an article support plate 26 which extends between the first and second conveyor lines 14 and 16 and provides an article support surface which is substantially coplanar with the article support surfaces of the conveyor lines 14 and 16. The article support plate 26 is bounded by a pair of upwardly extending guide rails 28 and 30 which provide, in combination with the article support plate 26, a path between the first and second conveyor lines 14 and 16 over which articles 22 can be transferred from the first conveyor line 14 to the second conveyor line 16 by means which will be described in detail hereinafter.

Article position sensing means 32 are mounted on the guide rail 30 at a position extending across the first conveyor line 14. The guide rail 30 and article position sensing means 32 prevent further conveyance of articles 22 along the first conveyor line 14 when each article abuts the article position sensing means in what will be termed a first position on the first conveyor line.

The article position sensing means comprises an air limit switch 34 mounted on a bracket 36 which is in turn fixedly secured to the guide rail 30 by suitable means such as threaded machine screws 38. A suitable unit for use as the air limit switch 34 is available from Clippard Instrument Laboratory, Inc., 7382 Colerain Road, Cincinnati, Ohio and is designated as a Model 1022 Proximity Switch. The air limit switch 34 is mounted with the sensing jet 40 thereof directed through an aperture 42 in the guide rail 30 with the air emanating from the sensing jet 40 directed toward the articles 22 being conveyed by the first conveyor line 14. A thin metal leaf spring 44 is secured at one end thereof to the guide rail 30 by suitable means such as threaded machine screws 46 and corresponding threaded nuts 48. The leaf spring extends across the aperture 42 and the sensing jet 40 of the air limit switch 34. When the leaf spring 44 is engaged by an article 22 being conveyed by the first conveyor line 14, the leaf spring 44 is deflected toward the guide rail 30, and, upon sufficient deflection of the leaf spring 44, as when the leaf spring comes within about 0.100 inches (2.54 mm) of the sensing jet 40, air flow into the sensing jet 34 through the supply port 50 thereof provides a positive pressure fluid output signal in the form of air flow from the output port 52 thereof indicating the presence of an article 22 at the first position on the first conveyor line 14.

An article transfer fluid power cylinder 54 is fixedly secured to a cylinder mounting block 56 which is fixedly secured to the support frame 12 and the guide rail 30 by suitable means such as threaded bolts 58. The power cylinder includes a cylinder body 60 and a ram 62 slidably disposed within the cylinder body and having a piston end and a rod end with the rod end 64 extending outwardly from the cylinder body along a line extending across and generally normal to the first conveyor line 14 toward the second conveyor line 16 along a line of extension above the article support plate 26 and between the guide rails 28 and 30. An article pusher bar 66 is fixedly secured to the rod end 64 of the ram 62 and provides means at 68 for engaging an article 22 for transfer of such article from the first position on the first conveyor line 14 to a second position on the second conveyor line 16 upon extension of the ram 62 relative to the cylinder body 60 of the article transfer fluid power cylinder 54. The article pusher bar 66 extends from its connection with the rod end 64 of the ram 62 along and substantially parallel to the cylinder body 60 as shown at 70. The extension 70 of the article pusher bar 66 is supported between a pair of rollers 72 disposed respectively above and below the extension 70 and journaled respectively on the mounting block 56. The extension 70 provides means for preventing the movement of an article 22 into the first position on the first conveyor line 14 when the article transfer fluid power cylinder 54 is extended. A cam member 74, in the form of an inclined ramp, is mounted on the extension 70 of the article pusher bar 66 and is adapted to engage and actuate a cam follower switch actuator 76 of an air switch 78 which is mounted by suitable means on a mounting block 80 which is in turn secured to the cylinder body 60. The cam member 74 is so positioned on the article pusher bar 66 that it engages the cam follower switch actuator 76 and trips the air switch 78 when the article transfer fluid power cylinder reaches the full desired extension thereof.

Means are further provided for interrupting the conveyance of articles along the second conveyor line 16 in the form of an article conveyance interrupting fluid power cylinder 82. The fluid power cylinder 82 is preferably mounted on the support frame 12 below the plane of the supporting surface of the second conveyor line 16 and comprises a cylinder body 84 and a ram 86 slidably disposed within the cylinder body 84 and having a piston end and a rod end 88 with the rod end 88 extending outwardly from the cylinder body 84 toward the second conveyor line along a line of extension of the ram 86 relative to the cylinder body 84. The line of extension of the ram 86 generally defines an acute angle with the line of movement of the second conveyor line 16, preferably an angle of about 45 degrees, with the line of extension extending generally in the direction of conveyance of the articles being conveyed by the second conveyor line 16. An extension assembly 90 is fixedly secured to the rod end 88 of the ram 86. The extension assembly 90 comprises a mounting bracket 92 which is directly secured to the rod end 88 of the ram 86. The mounting bracket 92 includes a longitudinal passage 94 extending therethrough in generally parallel alignment with the line of extension of the ram 86. The passage 94 includes a counterbore 96 communicating with the end of the bracket 92 nearest the second conveyor line 16. An extension member 98 having a rounded nose portion 100 formed on the outer end thereof is slidably disposed within the counterbore 96. A shaft 102, having a diameter less than the diameter of the extension member 98, is fixedly secured at the first end 104 thereof to the inner end portion 106 of the extension member 98 and extends through the portion of the longitudinal passage 94 of smaller diameter. The extension member 98 and shaft 102 are retained within the longitudinal passage 94 by means of a pair of threaded jam nuts 108 threadedly secured to the second end 110 of the shaft 102. A compression coil spring 112 is disposed about the shaft 102 intermediate the inner end portion 106 of the extension member 98 and the end wall 114 of the counterbore 96. The compression coil spring 112 provides means for continuously yieldably urging the extension member 98 toward the second conveyor line relative to the mounting bracket 92 and the ram 86 to which the mounting bracket is secured.

The article conveyance interrupting fluid power cylinder 82 is so positioned relative to the second conveyor line 16 that when the ram 86 is fully retracted relative to the cylinder body 84, the extension member 98 is withdrawn from the path of articles being conveyed by the second conveyor line 16, and, alternately, when the ram 86 is fully extended relative to the cylinder body 84 the extension member 98 extends a sufficient distance over the second conveyor line 16 to interrupt the conveyance of articles 22 therealong, as illustrated in dashed lines in FIG. 1, and prevent movement of articles 22 past the extension member 98 into the second position of the second conveyor line. The spring-loaded extension member 98 of the extension assembly 90 prevents damage to articles on the second conveyor line 16 which might be in the line of extension of the extension assembly 90. Also, the extension member 98 is preferably constructed of a synthetic resin material and the rounded nose portion 100 thereof prevents damage to the outer surface of an article contacted by the extension member 98 when the article conveyance interrupting fluid power cylinder 82 is extended.

Referring now to FIG. 4, the fluid control system of the multiple line conveyor apparatus 10 is schematically illustrated therein. A source of pressurized fluid, preferably a source of pressurized gas and more preferably still a source of pressurized air is connected by means of conduits 116, 118 and 120 to the input ports of respective pressure regulators 122 and 124. The output port of the pressure regulator 122 is connected in fluid flow communication with the supply port 50 of the air limit switch 34 of the article position sensing means 32 via conduit 126. The pressure regulator 122 preferably provides pressurized air to the supply port 50 generally in the range from about 2 to about 3 psig (about 13.5 to about 2 kPa). The output port of the pressure regulator 124 is connected in fluid flow communication with the supply port of a fluidic interface valve 128 via conduits 130 and 132. A suitable fluidic interface valve 128 is available from Clippard Instrument Laboratory, Inc. and is designated as Fluidamp 2010. The pressure regulator 124 preferably provides air at its output port at a pressure of about 20 psig (about 136 kPa). The conduit 132 is shown schematically as being in fluid communication with a first pilot port of the fluid interface valve 128 via conduit 134, however, in the Fluidamp 2010 valve this fluid communication is achieved internally of the fluidic interface valve. The exhaust port of the valve 128 is vented to the atmosphere. The second pilot port of the valve 128 is connected in fluid flow communication to the output port 52 of the air limit switch 34 via conduit 136. The load port of the valve 128 is connected in fluid flow communication to the extending control port of a four-way cylinder actuating valve 138 via conduit 140. The output port of the pressure regulator 124 is also connected in fluid flow communication with the supply port of the cylinder actuating valve 138 via conduits 130 and 142. The cylinder retracting output port of the cylinder actuating valve 138 is connected to the rod end of the cylinder body 60 of the article transfer fluid power cylinder 54 via conduits 144 and 146, while the cylinder retracting output port of the cylinder actuating valve 138 is also connected in fluid flow communication with the rod end of the cylinder body 84 of the article conveyance interrupting fluid power cylinder 82 via conduits 144 and 148. The cylinder extending output port of the cylinder actuating valve 138 is connected in fluid flow communication with the piston end of the cylinder body 60 of the article transfer fluid power cylinder 54 via conduits 150 and 152 with a variable flow control valve 154 interposed in conduit 152 to provide means for adjusting the rate of extension of the article transfer fluid power cylinder 54. The cylinder extending output port of the cylinder actuating valve 138 is also connected in fluid flow communication with the piston end of the cylinder body 84 of the article conveyance interrupting fluid power cylinder 82 via conduits 150, 156 and 158. The supply port of air switch 78 is connected in fluid flow communication with the piston end of the article transfer fluid power cylinder 54 via conduits 160, 156 and 152 as well as variable flow control valve 154. The output port of the air switch 78 is connected in fluid flow communication with the retracting control port of the cylinder actuating valve 138 via conduit 162. The exhaust port of the cylinder actuating valve 138 is vented to the atmosphere. A suitable four-way spool valve for use as the cylinder actuating valve 138 in the fluid control system illustrated in FIG. 4 is available from Clippard Instrument Laboratory, Inc. and is identified by the model designation MJV-4D with the extending control port and the retracting control port each being provided by a respective Model MPA-7 Miniature Pilot Actuator secured to the MJV-4D four-way valve.

The fluid control system illustrated in FIG. 4 operates in the following manner. Where there is no article in the first position on the first conveyor line 14 adjacent the leaf spring 44 of the article position sensing means 32, the various elements of the fluid control system are in the respective conditions illustrated in FIG. 4. When an article 22 is moved by the first conveyor line 14 into engagement with the spring 44, the spring is deflected toward the sensing jet 40 and when it is sufficiently close thereto the air limit switch 34 directs pressurized air through the conduit 136 to the appropriate control or pilot port of the fluidic interface valve 128 to change the state of the valve 128. Upon change of state of the valve 128, higher pressure air is passed through the valve 128 via conduit 140 to the extending control port of the four-way cylinder actuating valve 138 thus changing the state of the valve 138. Upon the change of state of the valve 138, pressurized air is passed therethrough through conduits 150 and 152 and variable flow control valve 154 to the piston end of the article transfer fluid power cylinder 54 and through conduits 150, 156 and 158 to the piston end of article conveyance interrupting fluid power cylinder 82 thus causing extension of both power cylinders. The flow restriction provided by the variable flow control valve 154 causes the article transfer fluid power cylinder 54 to extend at a reduced rate relative to the rate of extension of the article conveyance interrupting fluid power cylinder 82 so that the last article on the second conveyor line 16 which has not been blocked by the article conveyance interrupting fluid power cylinder 82 will be conveyed by the second conveyor line 16 a sufficient distance down the line so that the article being transferred from the first conveyor line 14 to the second conveyor line 16 upon the extension of the article transfer fluid power cylinder 54 will not be interfered with upon its entrance onto the second conveyor line 16.

When the article transfer fluid power cylinder 54 reaches full extension, the cam member 74 engages the cam follower switch actuator 76 of the air switch 78 thus changing the state of the air switch 78 and applying pressurized air from the air switch 78 through conduit 162 to the retracting control port of the cylinder actuating valve 138 thus returning the valve 138 to its initial state whereby pressurized air is routed therethrough to the rod end of the article transfer fluid power cylinder 54 and to the rod end of the article conveyance interrupting fluid power cylinder 82 thus simultaneously initiating retraction of both power cylinders. Upon retraction of both power cylinders, articles are free to be conveyed along by the first and second conveyor lines 14 and 16 until the next article in the first conveyor line 14 engages and moves the leaf spring 44 to actuate the air limit switch 34 and repeat the sequence of events described above.

From the foregoing detailed description it will be apparent that the apparatus of the present invention provides gentle, economical, simple and reliable means for merging articles from two conveyor lines into one conveyor line. The apparatus is well adapted for handling delicate articles which might be damaged by excessively rough handling which attends the use of most prior art devices. The employment of a fluidic proximity sensing device which is extremely sensitive to lightweight items and which is virtually unaffected by such conditions as shock, vibration, temperature changes or severe ambient air currents is extremely advantageous for use with conveyor apparatus handling paperboard containers, especially during the assembly of such paperboard containers.

Changes may be made in the combination and arrangement of parts or elements as heretofore set forth in the specification and shown in the drawings without departing from the spirit and scope of the invention as defined in the following claims.

I claim:

1. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article in said first position and providing a pressurized fluid output signal responsive to the thus sensed presence;

first pressure regulator means interposed in said first conduit means for regulating the pressure of the pressurized fluid between said first pressure regulator means and said article position sensing means to a predetermined value;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means; and said cylinder actuating valve means being further adapted for applying pressurized fluid to said article transfer fluid power cylinder means and to said article conveyance interrupting fluid power cylinder means in response to the output signal from said cylinder position sensing means to retract said article transfer fluid power cylinder means and said article conveyance interrupting fluid power cylinder means.

2. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article at said first position and providing a pressurized fluid output signal responsive to the thus sensed presence;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the pressurized fluid output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means;

said cylinder actuating valve means being further adapted for applying pressurized fluid to said article transfer fluid power cylinder means and to said article conveyance interrupting fluid power cylinder means in response to the pressurized fluid output signal from said cylinder position sensing means to retract said article transfer fluid power cylinder means and said article conveyance interrupting fluid power cylinder means; and said article position sensing means being characterized further to include:

air limit switch means for sensing the presence of an article proximate thereto, said air limit switch means having a sensing jet disposed so as to direct air output therefrom toward said first position on the first conveyor line, having a supply port connected in fluid flow communication to said first conduit means, and having an output port;

fluidic interface valve means adapted for valve action responsive to said air limit switch means, said fluidic interface valve means having a control port, a supply port, an exhaust port and a load port; said control port being connected in fluid flow communication by third conduit means to the output port of said air limit switch means; said supply port being connected in fluid flow communication to said second conduit means by fourth conduit means; and said load port being connected in fluid flow communication to extending control port means of said cylinder actuating valve means by fifth conduit means for transmitting said output signal from said load port of said article position sensing means to said cylinder actuating valve means; and wherein said source of pressurized fluid to which said first conduit means is connected in fluid flow communication is characterized further as a source of pressurized air.

3. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article at said first position and providing a pressurized fluid output signal responsive to the thus sensed presence;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the pressurized fluid output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means;

said cylinder actuating valve means being further adapted for applying pressurized fluid to said article transfer fluid power cylinder means and to said article conveyance interrupting fluid power cylinder means in response to the pressurized fluid output signal from said cylinder position sensing means to retract said article transfer fluid power cylinder means and said article conveyance interrupting fluid power cylinder means; and said cylinder position sensing means being characterized further to include:

third conduit means interconnected said first conduit means and retracting control port means of said cylinder actuating valve means in fluid flow communication;

cam responsive valve means interposed in said third conduit means for preventing fluid flow through said third conduit means in a first position of said cam responsive valve means, and, alternately, for allowing fluid flow through said third conduit means in a second position of said cam responsive valve means; and cam means carried by said article transfer fluid power cylinder means for actuating said cam responsive valve means from the first position to the second position thereof when said article transfer fluid power cylinder means is fully extended whereby said pressurized fluid output signal responsive to the full extension of said article transfer fluid power cylinder means is applied through said third conduit means to said retracting control port means of said cylinder actuating valve means.

4. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article at said first position and providing a pressurized fluid output signal responsive to the thus sensed presence;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the pressurized fluid output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means;

said cylinder actuating valve means being further adapted for applying pressurized fluid to said article transfer fluid power cylinder means and to said article conveyance interrupting fluid power cylinder means in response to the pressurized fluid output signal from said cylinder position sensing means to retract said article transfer fluid power cylinder means and said article conveyance interrupting fluid power cylinder means; and fluid flow control valve means interposed in said second conduit means intermediate said cylinder actuation valve means and said article transfer fluid power cylinder means for adjusting the rate of fluid flow therethrough so as to achieve a desired rate of extension of said article transfer fluid power cylinder means.

5. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article at said first position and providing a pressurized fluid output signal responsive to the thus sensed presence;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the pressurized fluid output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means;

said cylinder actuating valve means being further adapted for applying pressurized fluid to said article transfer fluid power cylinder means and to said article conveyance interrupting fluid power cylinder means in response to the pressurized fluid output signal from said cylinder position sensing means to retract said article transfer fluid power cylinder means and said article conveyance interrupting fluid power cylinder means; and wherein said article conveyance interrupting fluid power cylinder means is extendable along a line defining an acute angle with the line of movement of the second conveyor line and generally in the direction of conveyance of the articles being conveyed by the second conveyor line.

6. Apparatus for automatically merging articles being conveyed by first and second conveyor lines for conveyance by a single conveyor line, comprising:

article position sensing means disposed adjacent a first position on the first conveyor line and connected in fluid flow communication by first conduit means to a source of pressurized fluid for sensing the presence of an article at said first position and providing a pressurized fluid output signal responsive to the thus sensed presence;

article transfer fluid power cylinder means disposed adjacent said first position for extending to thereby transfer an article from said first position to a second position on the second conveyor line, and, alternately, for retracting to permit another article to be conveyed to said first position along the first conveyor line;

article conveyance interrupting fluid power cylinder means disposed adjacent said second position on the second conveyor line for extending to thereby interrupt conveyance of articles past the extended article conveyance interrupting fluid power cylinder means along the second conveyor line, and, alternately, for retracting to permit conveyance of articles past said second position along the second conveyor line;

cylinder actuating valve means connected in fluid flow communication to said article transfer fluid power cylinder means and to said article conveyance interrupting fluid power cylinder means and further connected in fluid flow communication to a source of pressurized fluid by second conduit means for applying pressurized fluid to said article transfer fluid power cylinder means and to said article conveyance interrupting fluid power cylinder means in response to the pressurized fluid output signal from said article position sensing means to extend said article transfer fluid power cylinder means and said article conveyance interrupting fluid power cylinder means;

cylinder position sensing means connected to a source of pressurized fluid for sensing the full extension of said article transfer fluid power cylinder means and providing a pressurized fluid output signal responsive to the full extension of said article transfer fluid power cylinder means;

said cylinder actuating valve means being further adapted for applying pressurized fluid to said article transfer fluid power cylinder means and to said article conveyance interrupting fluid power cylinder means in response to the pressurized fluid output signal from said cylinder position sensing means to retract said article transfer fluid power cylinder means and said article conveyance interrupting fluid power cylinder means; and wherein said article conveyance interrupting fluid power cylinder means is characterized further to include:

a cylinder body;

a ram slidably disposed within said cylinder body and having a piston end and a rod end with the rod end extending outwardly from said cylinder body toward the second conveyor line along a line of extension;

an extension member mounted on the rod end of said ram in slidable relation to said ram along a line generally parallel to the line of extension of said ram; and biasing means operatively related to said ram and to said extension member for continuously yieldably urging said extension member toward the second conveyor line relative to said ram.

7. An apparatus as defined in claim 1 characterized further to include:

second pressure regulator means interposed in said second conduit means for regulating the pressure of the pressurized fluid between said second pressure regulator means and said cylinder actuating valve means to a predetermined value.

8. An apparatus as defined in claim 2 wherein said source of pressurized fluid to which said second conduit means is connected in fluid flow communication is characterized further as a source of pressurized air.

9. An apparatus in accordance with claim 5 wherein said article conveyance interrupting fluid power cylinder means is characterized further to include:

a cylinder body;

a ram slidably disposed within said cylinder body and having a piston end and a rod end with the rod end extending outwardly from said cylinder body toward the second conveyor line along a line of extension;

an extension member mounted on the rod end of said ram in slidable relation to said ram along a line generally parallel to the line of extension of said ram; and biasing means operatively related to said ram and to said extension member for continuously yieldably urging said extension member toward the second conveyor line relative to said ram.

* * * * *